United States Patent [19]

Ballard

[11] Patent Number: 4,478,971

[45] Date of Patent: Oct. 23, 1984

[54] HIGH TEMPERATURE EXTRUDED POLYVINYL ALCOHOL MONOFILAMENT AND PROCESS FOR THE PREPARATION THEREOF

[75] Inventor: Larry Ballard, Columbia, S.C.

[73] Assignee: Shakespeare Company, Columbia, S.C.

[21] Appl. No.: 512,080

[22] Filed: Jul. 8, 1983

[51] Int. Cl.³ ............... C08J 5/00; C08K 5/05; C08L 29/04

[52] U.S. Cl. ............... 524/376; 264/185; 524/369; 524/388; 524/543

[58] Field of Search ............ 264/185; 524/369, 376, 524/388, 543

[56] References Cited

U.S. PATENT DOCUMENTS

| | | | |
|---|---|---|---|
| 2,146,295 | 2/1939 | Herrmann et al. | 264/185 |
| 3,365,527 | 1/1968 | Tanabe et al. | 264/185 |
| 3,409,598 | 11/1968 | Takigawa et al. | 264/185 |
| 3,607,812 | 9/1971 | Takigawa et al. | 264/185 |
| 3,660,556 | 5/1972 | Ashikaga et al. | 264/185 |
| 3,985,849 | 10/1976 | Notomi et al. | 264/185 |
| 4,206,101 | 6/1980 | Wysong | 264/185 |
| 4,244,914 | 1/1981 | Ranalli et al. | 264/185 |
| 4,323,492 | 4/1982 | Zimmermann et al. | 524/388 |
| 4,389,506 | 6/1983 | Hassall | 524/369 |

FOREIGN PATENT DOCUMENTS 54-150468  11/1979  Japan ............... 524/388

Primary Examiner—Ronald W. Griffin
Attorney, Agent, or Firm—Renner, Kenner, Greive & Bobak

[57] ABSTRACT

The invention disclosed herein provides a process for the high temperature extrusion of polyvinyl alcohol monofilament soluble in water comprising the steps of blending from about 80 to 98 percent by weight polyvinyl alcohol resin having a number average molecular weight of from about 10,000 to 200,000 and a degree of hydrolysis of from about 85 to 91 percent with from about 20 to 2 percent by weight of a plasticizer selected from the group consisting of hydroxyethers, diols, triols and other polyols and mixtures thereof, reducing the moisture content of the resin to a level of less than about one percent and the volatile content thereof to a level of less than about two percent and, melt extruding the blend to form monofilaments. A novel high temperature extruded polyvinyl alcohol monofilament, soluble in water, comprises from about 80 to 98 percent by weight polyvinyl alcohol resin having a number average molecular weight of from about 10,000 to 200,000 and a degree of hydrolysis of from about 85 to 91 percent and from about 20 to 2 percent by weight of a plasticizer selected from the group consisting of hydroxyethers having an average molecular weight of less than 325 and greater than 550 and having the formula

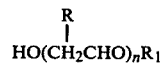

wherein R is hydrogen or methyl and $R_1$ is hydrogen, an alkyl group having from one to about 12 carbons and aromatic groups having from six to about 10 carbon atoms and n is an integer that will provide the aforementioned average molecular weight, diols, triols and other polyols having from two to about 10 carbons including mixtures thereof.

24 Claims, No Drawings

HIGH TEMPERATURE EXTRUDED POLYVINYL ALCOHOL MONOFILAMENT AND PROCESS FOR THE PREPARATION THEREOF

TECHNICAL FIELD

The present invention is directed toward water soluble monofilaments prepared from a modified polyvinyl alcohol resin and a hydroxyether, diol, triol or other polyol serving as a plasticizer. Polyvinyl alcohol is one of only a few readily available water soluble polymers. It can be purchased in powder or granular form and is prepared by hydrolysis of polyvinylacetate. Water solubility of the polymer is a function of molecular weight, degree of hydrolysis and percent crystallinity; thus, a low molecular weight, partially hydrolyzed, amorphous polymer is readily soluble in cold water while a higher molecular weight, completely hydrolyzed crystalline polymer is only slowly soluble in hot water.

A water soluble, high tenacity monofilament is desirable in numerous textile applications. For example, fabrics can be knitted or woven by using a water soluble filament combined with conventional water insoluble yarn. During the scouring or dyeing of the fabric, the water soluble filament is eliminated, thus creating, in a very easy way, a soft bulky fabric which can be used in such applications as high porosity filter fabric, very absorbant soft towels and the like. Another important use for a readily removable filament is as a "separator yarn" for easier handling of knitted goods during the knitting and dyeing operations.

BACKGROUND ART

Polyvinyl alcohol polymers are not thermoplastic resins processable by conventional melt spinning, injection molding or melt extrusion. When subjected to heat, polyvinyl alcohol decomposes readily before reaching its melt temperature. Existing art shows that continuous multifilament yarns have been spun by solution spinning or wet spinning processes wherein polyvinyl alcohol is dissolved in a suitable solvent, usually water, forced through a spinnerette and the filaments coagulated in a precipitating bath.

One U.S. patent directed to this approach is U.S. Pat. No. 3,365,527 which describes a method for spinning polyvinyl alcohol fibers into a caustic coagulating bath. Polyvinyl alcohols that are low water swelling are preferred.

U.S. Pat. No. 3,660,556 provides a similar process wherein an aqueous polyvinyl alcohol solution, containing a water soluble boric acid compound adjusting the pH to 3 to 5, is coagulated in a caustic bath having a pH of 13.5 to 14.

Solution processing suffers several limitations. First, the filament formation by precipitation out of an aqueous solution requires a polymer with a limited water solubility. It has not been possible heretofore to produce large diameter monofilament without substantial failure. In addition, such a process requires very costly equipment which can only be profitable if operated on a very large scale.

High temperature extrusion of polyvinyl alcohol films is known, however. One U.S. patent directed to this approach is U.S. Pat. No. 3,607,812 which describes a method for extruding a mixture of polyvinyl alcohol resin having a degree of hydrolysis of at least 97 percent and containing sodium acetate, and a polyhydric alcohol plasticizer compatible with the resin. The resulting films are insoluble in water at temperatures below 40° C., but readily soluble in warmer water.

U.S. Pat. No. 3,985,849 is directed toward a method for preparing a biaxially oriented polyvinyl alcohol film by extruding a mixture of polyvinyl alcohol resin, water and optionally a polyhydric alcohol plasticizer. The polyvinyl alcohol resin has a degree of polymerization of between 1100 and 2000 and a degree of hydrolysis of not less than 98 percent.

U.S. Pat. No. 4,206,101 discloses a composition suitable for use in the preparation of extrudable cold water soluble films comprising a partially hydrolyzed low molecular weight polyvinyl alcohol and a polyethylene glycol. The polyethylene glycols must have an average molecular weight in the range of about 325 to 550, those with higher or lower molecular weights were reported to be unsatisfactory. The patent also states that the use of glycerin as the plasticizer will yield an unsatisfactory composition.

Thus, while certain techniques have been developed to produce polyvinyl alcohol films, the art of which I am aware has not provided a process for producing the desired water soluble, oriented, continuous polyvinyl alcohol monofilament.

DISCLOSURE OF THE INVENTION

In general, the process of the present invention for the high temperature extrusion of polyvinyl alcohol monofilament soluble in water comprises the steps of blending from about 80 to 98 percent by weight polyvinyl alcohol resin having a number average molecular weight of from about 10,000 to 200,000 and a degree of hydrolysis of from about 85 to 91 percent with from about 20 to 2 percent by weight of a plasticizer selected from the group consisting of hydroxyethers having an average molecular weight of less than 325 and greater than 550 and having the formula

$$HO(CH_2CHO)_nR_1$$
with R above the O wherein R is hydrogen or methyl and $R_1$ is hydrogen, an alkyl group having from one to about 12 carbons and aromatic groups having from six to about 10 carbon atoms and n is an integer that will provide the aforementioned average molecular weight, diols, triols and other polyols having from two to about 10 carbons and mixtures thereof, reducing the moisture content of the resin to a level of less than about one percent and the volatile content thereof to a level of less than about two percent and, extruding the blend to form monofilaments.

A novel high temperature extruded polyvinyl alcohol monofilament, soluble in water, is also provided herein. The composition of the filament comprises from about 80 to 98 percent by weight polyvinyl alcohol resin having a number average molecular weight of from about 10,000 to 200,000 and a degree of hydrolysis of from about 85 to 91 percent, and from about 20 to 2 percent by weight of a plasticizer selected from the group consisting of hydroxyethers having an average molecular weight of less than 325 and greater than 550 and having the formula

$$HO(CH_2CHO)_nR_1$$

wherein R is hydrogen or methyl and $R_1$ is hydrogen, an alkyl group having from one to about 12 carbons and aromatic groups having from six to about 10 carbon atoms and n is an integer that will provide the aforementioned average molecular weight, diols, triols and other polyols having from two to about 10 carbons and mixtures thereof.

PREFERRED MODE FOR CARRYING OUT THE INVENTION

The polyvinyl alcohol resin employed in the present invention is characterized by having a number average molecular weight ranging from about 10,000 to 200,000 and preferably about 20,000 to 100,000. A minimum molecular weight of about 10,000 is required for sufficient tenacity of the resulting monofilaments; a maximum of about 200,000 is a limit above which the monofilament dissolves too slowly in hot water. The polyvinyl alcohol resin should also have a degree of hydrolysis ranging from about 85 to 96 percent and preferably about 86 to 91 percent. A minimum degree of hydrolysis is required to avoid producing a monofilament too sensitive to the action of ambient temperature such that the tenacity would drop to an unacceptable level. The upper limit is a limit above which the water solubility of the monofilament begins to become too low. Finally, the volatile content of the resin should be less than about two percent and preferably less than about one percent. This level is necessary to achieve a uniform extrudate when the resin is melted.

Commercially available and acceptable polyvinyl alcohol resins include Vinol®205, Vinol®WS51, Vinol®205S, Vinol®107, Gelvatol®20-30 and Gelvatol®3000. Vinol is a registered trademark of Air Products and Chemicals, Inc. Gelvatol is a registered trademark of Monsanto Company. The monofilaments of the present invention comprise from about 80 to 98 percent by weight of the polyvinyl alcohol resin and from about 20 to 2 percent by weight and preferably 5 to 15 percent by weight of a plasticizer.

The plasticizers of the present invention must have a low vapor pressure, a high boiling temperature and remain stable at the extrusion temperature which can reach 230° C. They must also be highly compatible with the polyvinyl alcohol resin and be absorbed quickly when in contact with the polymer in powder or granular form. It is also desirable to have the plasticizer in liquid form when blended with the polyvinyl alcohol resin. Finally it is advantageous to have a water soluble plasticizer so that no residue remains after the fiber dissolves. Suitable plasticizers include certain hydroxyethers, diols, triols and other polyols. The hydroxyether compound is defined as:

$$HO(CH_2CHO)_nR_1$$

wherein R is hydrogen or methyl and $R_1$ is hydrogen, an alkyl group having from one to about 12 carbon atoms. When R is hydrogen, glycols and polyethylene glycols result.

The glycols that can be employed include those specifically excluded from the disclosure in U.S. Pat. No. 4,206,101 viz., those having an average molecular weight of less than 325 and greater than 550. Such compounds include diethylene glycol, triethylene glycol and tetraethylene glycol. Also useful are the polyethylene glycols modified with an aromatic group such as phenyl, tolyl, xylyl and the like. One particularly useful aryl-modified polyethylene glycol is Stysolac distributed by Kane International, Larchmont, N.Y. The structure of Stysolac is believed to be

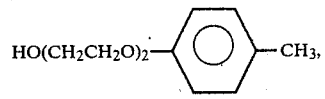

$$HO(CH_2CH_2O)_2-\langle\bigcirc\rangle-CH_3,$$

the $R_1$ being tolyl. The value of n in the hydroxyether will be selected with respect to the R and $R_1$ groups so that the average molecular weight of the compound does not fall between 325 and 550.

Regarding the diols, 2,2-dimethyl-1,3-butanediol, 2,3-butylene glycol and ethylene glycol can be employed. Regarding the triols, glycerin is preferred although those having from three to about 10 carbons can be employed which typically include compounds such as 1,2,4-butanetriol and 1,2,6-hexanetriol.

The foregoing plasticizers can be used individually or in combination. In the preferred practice of the invention, the plasticizer should be in liquid form when blended with the polyvinyl alcohol powder. In the case of high molecular weight plasticizers which are solid or waxy at room temperatures, the blending should be carried out either above the melt point of the plasticizer or the plasticizer can be dissolved first in a liquid plasticizer and the combination blended with the polyvinyl alcohol.

The process of producing the monofilament comprises the steps of blending the plasticizer and polyvinyl alcohol resin in the aforesaid amounts. High speed and high shear mixing combined with external heating is the preferred mode of blending inasmuch as it promotes uniform blending and insures steady conditions for the extrusion, consistent stretch ratios and good gauge control of the monofilaments. A Henschel mixer is an example of a suitable high speed and high shear mixer. The high speed and high shear mixing serves to break-up resin agglomerates which form as the plasticizer is added, while the heating aids in the absorption of the plasticizer by the resin. The mixing itself takes place by slowly adding the plasticizer to the resin at a low speed and then increasing the speed and maintaining the temperature between about 65° C. to 150° C. Blending times range between 5 to 30 minutes.

An alternative method for the blending is to preheat the resin to about 65° C. to 150° C. before the plasticizer is added. Also, the blend can be prepared in a low shear mixer such as a Cowles mixer or cage mixer as long as external heat is added during or after the mixing.

The resulting blend is powdery and free flowing. The blend, before extrusion, must have a moisture content less than about one percent and preferably less than about 0.5 percent. Also the volatiles content of the resin, determined by weight loss after heating at 105° C. for 30 minutes, should be less than two percent and preferably less than one percent. These levels of moisture and volatiles are necessary in order to achieve a uniform extrudate when the resin is melted.

Satisfactory levels of moisture and volatiles can be achieved by drying the blended resins at 85° C. under vacuum or by heating the polyvinyl alcohol in a high shear mixer under vacuum before the plasticizer is added. It is also possible to achieve satisfactory levels of moisture and volatiles by applying a vacuum to the blended resin at temperatures ranging from 20° C. to 150° C. and preferably from 35° C. to 95° C. in a vacuum dryer.

Next, the powder blend is extruded through a conventional melt extruder such as the type used for the extrusion of nylon and polyester monofilaments. The dies utilized are of conventional geometry with holes shaped to produce filaments with diameters ranging from 0.07 mm to 4.0 mm and with various cross-sections such as circular, rectangular, Y-shape or X-shape. The die temperature should range between about 165° C. and 230° C.

The extruded monofilaments are subsequently quenched in air by allowing the monofilaments to drop vertically to the first guide roll. Quenching in a liquid such as silicone oil or water, saturated with a salt such as sodium sulfate, is also possible.

The monofilaments are next separated and aligned parallel to each other and then stretched between godets in a conventional hot air oven. Stretch ratios of about 2.5 to 4.0 bring the tenacity of the filaments above the desired 1.0 grams per denier. The monofilaments can also be heat set and relaxed in the hot air oven. Heat setting increases the crystallinity and break elongation of the monofilaments.

Finally the monofilaments are wound onto separate spools and placed in moisture-proof packages to avoid exposure to moisture prior to usage.

In the work which is reported hereinbelow, polyvinyl alcohol (PVA) high temperature processable monofilaments have been produced and characterized. Properties measured and reported for the resins include degree of hydrolysis and molecular weight. Properties of the filaments formed include tenacity and break elongation. The examples are only offered by way of illustration, and they should not be construed to restrict or limit the scope of the invention and its claims.

PREPARATION OF PVA MONOFILAMENTS

Example 1

Into a Henschel mixer was charged 23 kilograms of Vinol ®WS51 resin followed by 2.3 kilograms of glycerin. Glycerin addition was gradual and continuous over one minute while the mixer was run at low speed. Thereafter the mixer speed was increased to high and mixing was continued until the temperature reached about 78° C. At this point, the mixture was dry and free flowing. The resulting blend was fed into a conventional Modern Plastics 4.4 cm extruder. The resin was extruded through a conventional die and formed into monofilaments which were stretched to a ratio of 3.5 to 1 and wound onto a spool.

Example 2

23 kilograms of Vinol ®WS51 was loaded into the Henschel mixer, followed by the addition, at low speed, of 0.69 kilograms glycerin over a period of one minute. After the glycerin was added, the mixer speed was increased and mixing was continued until the temperature reached 78° C. The resulting mixture was removed and extruded as in Example 1.

Examples 3-9

These were prepared in the manner set forth in Example 1 with the following differences:
Example 3: Predried Vinol ®205 was employed
Example 4: Predried Vinol ®205S was employed
Example 5: Predried Vinol ®WS51 was employed, plus a vacuum was applied during mixing as in Example 10
Example 6: Predried Vinol ®WS51, plus 3.45 kilograms of glycerin was employed
Example 7: Predried Vinol ®WS51 and 2.3 kilograms of Stysolac ®AW was substituted for glycerin as the plasticizer.
Example 8: Vinol ®107 was employed with 1.4 kilograms of Stysolac ®AW
Example 9: Vinol ®107 was employed with 2.3 kilograms of Stysolac ®AW

Example 10

23 kilograms of Vinol ®205 was loaded into the Henschel mixer. The mixer was run on high speed until the resin temperature reached 122° C. During mixing, a vacuum (254 mm) was applied to the mixer to aid in the removal of water. When the desired temperature was reached (after 27 minutes) the mixer was shut off and the resin was allowed to sit for another 20 minutes while the vacuum was applied. After 20 minutes, 2.3 kilograms of glycerin was added, the mixture was removed and was extruded as in Example 1.

Example 11

1000 grams of Monsanto Gelvatol ®20-30 was mixed with 100 grams of glycerin in a Cowles mixer. After mixing, the mixture was heated at 110° C. for 30 minutes to allow the glycerin to be absorbed by the polyvinyl alcohol. After heating, the resin was extruded through a 1.9 cm laboratory extruder using a draw ratio of 3.5 to 1.

Examples 12-13

These were prepared in the manner set forth in Example 11 with the following differences:
Example 12: Gelvatol ®20-30 was employed and 100 grams of ethylene glycol was substituted as the plasticizer.
Example 13: Gelvatol ®20-30 was employed and 100 grams of trimethylol propane was substituted as the plasticizer.

Example 14

1000 grams of Vinol ®WS51 was mixed with 100 grams glycerin using a planetary mixer. After mixing for 10 minutes, the mixture was removed and heated at 110° C. for 30 minutes to allow the glycerin to be absorbed. After heating, the resin was extruded using a 1.9 cm laboratory extruder.

The degree of hydrolysis and molecular weight of the various resins employed in Examples 1 to 14 have been set forth in Table I.

TABLE I

| PVA Resin | Hydrolysis % | Molecular weight (approximate) |
|---|---|---|
| Vinol ® WS51 | 87.0-89.0 | 22,000-31,000 |
| Vinol ® 205 | 87.0-89.0 | 22,000-31,000 |
| Vinol ® 205S | 87.0-91.0 | 22,000-31,000 |
| Vinol ® 107 | 98.0-98.8 | 22,000-31,000 |

TABLE I-continued

| PVA Resin | Hydrolysis % | Molecular weight (approximate) |
| --- | --- | --- |
| Gelvatol ® 20-30 | 88.7-85.5 | 10,000 |

The filaments prepared in Examples 1 to 10 were tested to ascertain physical properties and characteristics including tenacity and break elongation before and after conditioning. The results appear in Tables II and III, respectively. Conditioning for Table III involved subjecting the filaments to storage for 24 hours at 22° C. and 70% relative humidity. All filaments were tested for cold water solubility as follows:

A section of PVA filament was placed in a flask of water at room temperature so that it could be observed visually. The flask was gently shaken until the filament totally disappeared (dissolved). Each filament was found to be totally soluble in water at 25° C.

TABLE II

| | Monofilament Physical Properties (Before Conditioning) | |
| --- | --- | --- |
| Example No. | Tenacity gms/denier | Break Elongation % |
| 1 | 2.7 | 11.4 |
| 2 | 5.0 | 10.9 |
| 3 | 2.8 | 12.1 |
| 4 | 2.6 | 11.8 |
| 5 | 2.8 | 12.0 |
| 6 | 2.9 | 15.3 |
| 7 | 4.2 | 5.5 |
| 8 | 4.6 | 9.2 |
| 9 | 2.3 | 26.2 |
| 10 | 2.8 | 12.4 |

As seen in Table II, the most significant affect on the properties of the PVA monofilament is brought about by the quantity of plasticizer used. Thus the tenacity of the filament in Example 2 is increased by a large factor compared to that of Example 1 because a smaller quantity of glycerin was used (3% compared to 10%). The type of resin and the mixing conditions did not greatly influence the filament properties.

TABLE III

| | Monofilament Physical Properties (After Conditioning) | |
| --- | --- | --- |
| Example No. | Tenacity gms/denier | Break Elongation % |
| 1 | 1.2 | 14.7 |
| 2 | 2.4 | 14.4 |
| 3 | 1.3 | 15.6 |
| 4 | 1.2 | 14.7 |
| 5 | 1.7 | 16.1 |
| 6 | 1.5 | 17.0 |
| 7 | 3.3 | 10.4 |
| 8 | 3.4 | 14.1 |
| 9 | 1.1 | 43.8 |
| 10 | 1.7 | 16.3 |

From Table III, conditioned properties of the filaments, it is seen that the tenacity of filaments containing glycerin as a plasticizer were reduced by a factor of two or more whereas filaments using Stysolac (Examples 7 and 8) retained nearly 80% of the initial tenacity.

Based on the foregoing results reported herein, it can be seen that the use of a plasticizer of the type disclosed herein in conjunction with PVA resins, having the degree of hydrolysis and molecular weight ranges disclosed will result in a high temperature processable, cold water soluble monofilament. It is to be understood that the use of particular components as well as the amounts thereof can be made depending upon the filament properties desired. Similarly, control over the process regarding mixing time, temperature, vacuum, quenching conditions, filament shape and size and the like can be varied as desired depending upon the apparatus employed and the filament to be prepared.

Thus, it can be seen that the disclosed invention carries out the objects set forth hereinabove. It is believed that the variables disclosed herein can readily be determined and controlled without departing from the spirit of the invention herein disclosed and described. Moreover, the scope of the invention shall include all modifications and variations that fall within the scope of the attached claims.

I claim:

1. A process for the high temperature extrusion of polyvinyl alcohol monofilament soluble in water comprising the steps of:

blending from about 80 to 98 percent by weight of a previously hydrolyzed polyvinyl alcohol resin having a number average molecular weight of from about 10,000 to 200,000 and a degree of hydrolysis of from about 85 to 96 percent with from about 20 to 2 percent by weight of a plasticizer selected from the group consisting of hydroxyethers having an average molecular weight of less than 325 and greater than 550 and having the formula

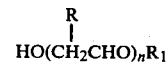

wherein R is hydrogen or methyl and $R_1$ is hydrogen, an alkyl group having from one to about 12 carbons and aromatic groups having from six to about 10 carbon atoms and n is an integer that will provide said average molecular weight, diols, triols and other polyols having from two to about 10 carbons and mixtures thereof;

reducing the moisture content of said resin to a level of less than about one percent and the volatile content thereof to a level of less than about two percent; and extruding said blend to form monofilaments; wherein said monofilaments have a tenacity of from about 1.0 to 5.0 grams per denier and an elongation at break of from about five to 50 percent.

2. The process, as set forth in claim 1, wherein said resin has a number average molecular weight ranging from about 10,000 to about 100,000, and a degree of hydrolysis of from about 86 to 91 percent.

3. The process, as set forth in claim 1, wherein said plasticizer is glycerin.

4. The process, as set forth in claim 1, wherein said plasticizer is ethylene glycol.

5. The process, as set forth in claim 1, wherein said plasticizer is trimethylol propane.

6. The process, as set forth in claim 1, wherein said plasticizer has the formula

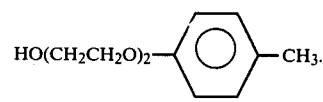

7. The process, as set forth in claim 1, wherein the step of reducing moisture includes the step of:
   drying the resin-plasticizer blend at a temperature of about 85° C.

8. The process, as set forth in claim 7, including the further step of applying a vacuum while drying.

9. The process, as set forth in claim 1, wherein the step of reducing moisture includes the step of:
   drying said resin under a vacuum at a temperaure of from about 20° to about 150° C.

10. The process, as set forth in claim 1, including the additional steps of:
    quenching, orienting and heat setting said monofilament after extruding and,
    thereafter winding said monofilament onto a spool.

11. The process, as set forth in claim 10, wherein said step of quenching includes the step of passing said extruded monofilament through air.

12. The process, as set forth in claim 10, wherein said step of quenching includes the step of passing said extruded monofilament through a liquid selected from the group consisting of oil, water and aqueous salt solutions.

13. The process, as set forth in claim 1, wherein said blending is done at a temperature of from about 65° C. to 150° C. and for a period of between 5 to 30 minutes.

14. The process, as set forth in claim 1, wherein said tenacity of said monofilaments is from about 1.5 to 3.0 grams per denier.

15. The process, as set forth in claim 1, wherein said elongation at break of said monofilaments is from about 10 to 30 percent.

16. A high temperature extruded polyvinyl alcohol monofilament soluble in water comprising:
    from about 80 to 98 percent by weight polyvinyl alcohol resin having a number average molecular weight of from about 10,000 to 200,000 and a degree of hydrolysis of from about 85 to 96 percent and, from about 20 to 2 percent by weight of a plasticizer selected from the group consisting of hydroxyethers having an average molecular weight of less than 325 and greater than 550 and having the formula

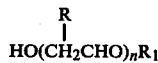

wherein R is hydrogen or methyl and $R_1$ is hydrogen, an alkyl group having from one to about 12 carbons and aromatic groups having from six to about 10 carbon atoms and n is an integer that will provide said average molecular weight, diols, triols and other polyols having from two to about 10 carbons and mixtures thereof the polyvinyl alcohol having been hydrolyzed prior to the addition of the plasticizer;
    wherein said high temperature extruded polyvinyl alcohol monofilament soluble in water has a tenacity of from about 1.0 to 5.0 grams per denier and an elongation at break of from about five to 50 percent.

17. The high temperature extruded polyvinyl alcohol monofilament soluble in water, as set forth in claim 16, wherein said resin has a number average molecular weight ranging from about 10,000 to about 100,000, and a degree of hydrolysis of from about 86 to 91 percent.

18. The high temperature extruded polyvinyl alcohol monofilament soluble in water, as set forth in claim 14, wherein said plasticizer is glycerin.

19. The high temperature extruded polyvinyl alcohol monofilament soluble in water, as set forth in claim 14, wherein said plasticizer is ethylene glycol.

20. The high temperature extruded polyvinyl alcohol monofilament soluble in water, as set forth in claim 14, wherein said plasticizer is trimethylol propane.

21. The high temperature extruded polyvinyl alcohol monofilament soluble in water, as set forth in claim 14, wherein said plasticizer has the formula

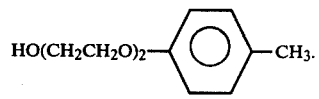

22. The high temperature extruded polyvinyl alcohol monofilament soluble in water, as set forth in claim 16, wherein said monofilament is soluble in water at 25° C.

23. The high temperature extruded polyvinyl alcohol monofilament soluble in water, as set forth in claim 16, wherein the tenacity of said monofilament is from about 1.5 to 3.0 grams per denier.

24. The high temperature extruded polyvinyl alcohol monofilament soluble in water, as set forth in claim 16, wherein the elongation at break of said monofilaments is from about 10 to 30 percent.

* * * * *